US010415900B2

(12) United States Patent
Riendeau

(10) Patent No.: US 10,415,900 B2
(45) Date of Patent: Sep. 17, 2019

(54) HEAT / ENTHALPY EXCHANGER ELEMENT AND METHOD FOR THE PRODUCTION

(71) Applicant: Westwind Limited, London (GB)

(72) Inventor: Marcel Riendeau, Shefford (CA)

(73) Assignee: WESTWIND LIMITED, London (GB)

( * ) Notice: Subject to any disclaimer, the term of this patent is extended or adjusted under 35 U.S.C. 154(b) by 0 days.

(21) Appl. No.: 14/906,205

(22) PCT Filed: Jul. 11, 2014

(86) PCT No.: PCT/CA2014/000566
§ 371 (c)(1),
(2) Date: Jan. 19, 2016

(87) PCT Pub. No.: WO2015/006856
PCT Pub. Date: Jan. 22, 2015

(65) Prior Publication Data
US 2016/0161198 A1    Jun. 9, 2016

Related U.S. Application Data

(60) Provisional application No. 61/856,306, filed on Jul. 19, 2013.

(51) Int. Cl.
*F28F 13/18* (2006.01)
*B23P 15/26* (2006.01)
(Continued)

(52) U.S. Cl.
CPC .............. *F28F 13/18* (2013.01); *B23P 15/26* (2013.01); *B29C 51/105* (2013.01);
(Continued)

(58) Field of Classification Search
CPC ... F28D 21/0014; F28D 21/0015; F28D 20/02
(Continued)

(56) References Cited

U.S. PATENT DOCUMENTS 2,798,892 A    7/1957  Penberthy
3,220,960 A   11/1965  Wichterle et al.
(Continued)

FOREIGN PATENT DOCUMENTS

CA    2 383 487    5/2003
CA    2826995      8/2012
(Continued)

OTHER PUBLICATIONS

Chinese Office Action in Chinese Application No. 201210529775.9, dated Oct. 29, 2015.
(Continued)

*Primary Examiner* — Allen J Flanigan
(74) *Attorney, Agent, or Firm* — Leason Ellis LLP

(57) ABSTRACT

Methods, plate elements and heat/enthalpy exchangers. a) perforating an unformed plate element with defined outer dimensions in any desired area and in any desired dimension; b) covering at least one side of the unformed plate element with a thin polymer film with latent energy exchange characteristics and; c) forming the plate element into a desired shape and a pattern of corrugations and/or embossing. The operations b) and c) may be performed in a different order. For instance, when the plate element is made out of plastic, b) may be performed before c) whereas, when the plate element is made out of aluminum (or plastic), c) may be performed before b). Operations a) and/or b) and/or c) may also, in certain embodiments, be combined.

33 Claims, 6 Drawing Sheets

(51) Int. Cl.

| | | |
|---|---|---|
| *B32B 38/04* | (2006.01) | |
| *F28F 21/08* | (2006.01) | |
| *F28D 21/00* | (2006.01) | |
| *B29C 51/10* | (2006.01) | |
| *B29C 51/26* | (2006.01) | |
| *F28F 3/02* | (2006.01) | |
| *F28F 21/06* | (2006.01) | |
| *B32B 37/12* | (2006.01) | |
| *B32B 38/12* | (2006.01) | |
| *B29C 51/08* | (2006.01) | |
| *B29K 105/00* | (2006.01) | |
| *B29L 31/18* | (2006.01) | |
| *B32B 37/20* | (2006.01) | |
| *B29C 51/14* | (2006.01) | |
| *B29C 51/02* | (2006.01) | |
| *B29C 51/32* | (2006.01) | |
| *B29L 9/00* | (2006.01) | |
| *B32B 38/06* | (2006.01) | |

(52) U.S. Cl.
CPC ............ *B29C 51/265* (2013.01); *B32B 38/04* (2013.01); *F28D 21/0015* (2013.01); *F28F 3/02* (2013.01); *F28F 21/08* (2013.01); *B29C 51/02* (2013.01); *B29C 51/082* (2013.01); *B29C 51/14* (2013.01); *B29C 51/32* (2013.01); *B29K 2105/0085* (2013.01); *B29K 2105/256* (2013.01); *B29L 2009/001* (2013.01); *B29L 2031/18* (2013.01); *B32B 37/12* (2013.01); *B32B 37/203* (2013.01); *B32B 38/06* (2013.01); *B32B 38/12* (2013.01); *B32B 2038/047* (2013.01); *B32B 2307/724* (2013.01); *F28F 21/06* (2013.01); *F28F 2255/08* (2013.01); *F28F 2275/02* (2013.01); *F28F 2275/04* (2013.01); *F28F 2275/06* (2013.01)

(58) Field of Classification Search
USPC .................................................. 165/133, 166
See application file for complete search history.

(56) References Cited

U.S. PATENT DOCUMENTS

| | | |
|---|---|---|
| 3,573,158 A | 3/1971 | Pall et al. |
| 3,682,028 A | 8/1972 | Clayton et al. |
| 3,698,222 A | 10/1972 | Blake |
| 3,847,211 A | 11/1974 | Fischel |
| 3,993,517 A | 11/1976 | Schneider |
| 4,247,498 A | 1/1981 | Castro |
| 4,460,388 A | 7/1984 | Fukami et al. |
| 4,744,414 A | 5/1988 | Schon |
| 4,807,588 A | 2/1989 | Bentley et al. |
| 4,925,732 A | 5/1990 | Driskill et al. |
| 4,927,535 A | 5/1990 | Beck et al. |
| 5,039,418 A | 8/1991 | Schucker |
| 5,069,276 A | 12/1991 | Seidel |
| 5,120,813 A | 6/1992 | Ward, Jr. |
| 5,869,412 A | 2/1999 | Yenni, Jr. et al. |
| 5,897,925 A | 4/1999 | Huang et al. |
| 6,013,376 A | 1/2000 | Yenni, Jr. |
| 6,032,730 A | 3/2000 | Akita et al. |
| 6,033,771 A | 3/2000 | Heffelfinger |
| 6,133,168 A | 10/2000 | Doyle et al. |
| 6,145,588 A | 11/2000 | Martin et al. |
| 6,228,506 B1 | 5/2001 | Hosatte et al. |
| 6,233,824 B1 | 5/2001 | Dobbs |
| 6,410,465 B1 | 6/2002 | Lim et al. |
| 6,413,298 B1 | 7/2002 | Wnek et al. |
| 6,635,104 B2 | 10/2003 | Komkova et al. |
| 6,675,705 B2 | 1/2004 | Yamamoto et al. |
| 6,684,943 B2 | 2/2004 | Dobbs et al. |
| 6,706,413 B2 | 3/2004 | Bohringer et al. |
| 6,737,158 B1 | 5/2004 | Thompson |
| 6,841,601 B2 | 1/2005 | Serpico et al. |
| 6,951,242 B1 | 10/2005 | Des Champs et al. |
| 6,953,510 B1 | 10/2005 | Mackay et al. |
| 7,128,138 B2 | 10/2006 | Des Champs |
| 7,152,670 B2 | 12/2006 | Dobbs et al. |
| 7,320,361 B2 | 1/2008 | Arai et al. |
| 7,386,924 B2 | 6/2008 | Muth et al. |
| 7,459,085 B2 | 12/2008 | Koguma et al. |
| 7,572,321 B2 | 8/2009 | Yamakawa et al. |
| 7,635,513 B1 | 12/2009 | Hoshuyama et al. |
| 7,737,224 B2 | 6/2010 | Willis et al. |
| 7,837,912 B2 | 11/2010 | Bristow et al. |
| 8,012,539 B2 | 9/2011 | Handlin, Jr. et al. |
| 8,283,029 B2 | 10/2012 | Jones et al. |
| 8,550,151 B2 | 10/2013 | Murayama et al. |
| 8,607,851 B2 | 12/2013 | Takada et al. |
| 8,936,668 B2 | 1/2015 | Huizing et al. |
| 9,194,630 B2 | 11/2015 | Mariotto et al. |
| 9,255,744 B2 | 2/2016 | Huizing |
| 9,429,366 B2 | 8/2016 | Dubois |
| 9,517,433 B2 | 12/2016 | Huizing et al. |
| 9,562,726 B1 | 2/2017 | Eplee |
| 2001/0004500 A1 | 6/2001 | Grasso |
| 2003/0035943 A1 | 2/2003 | Jones et al. |
| 2003/0106680 A1 | 6/2003 | Serpico et al. |
| 2004/0140085 A1 | 7/2004 | Dobbs et al. |
| 2006/0051530 A1 | 3/2006 | Schwarz et al. |
| 2006/0162563 A1 | 7/2006 | Poschmann |
| 2006/0168813 A1 | 8/2006 | Arai et al. |
| 2006/0229373 A1 | 10/2006 | Guerra et al. |
| 2007/0021569 A1 | 1/2007 | Willis et al. |
| 2007/0095514 A1 | 5/2007 | Inoue et al. |
| 2007/0163433 A1 | 7/2007 | Chen |
| 2008/0085437 A1 | 4/2008 | Dean et al. |
| 2008/0128941 A1 | 6/2008 | Lopez et al. |
| 2008/0210625 A1 | 9/2008 | Mitchell et al. |
| 2008/0308262 A1 | 12/2008 | Sauer et al. |
| 2009/0098352 A1 | 4/2009 | Wittmann et al. |
| 2009/0098432 A1 | 4/2009 | Rosenberg et al. |
| 2009/0314480 A1 | 12/2009 | Greinbergs et al. |
| 2010/0032145 A1 | 2/2010 | Lee |
| 2011/0146941 A1 | 6/2011 | Benoit et al. |
| 2011/0192579 A1 | 8/2011 | Sotokawa et al. |
| 2011/0230614 A1 | 9/2011 | Handlin, Jr. et al. |
| 2011/0259572 A1 | 10/2011 | Muratani et al. |
| 2012/0071575 A1 | 3/2012 | De Rosa et al. |
| 2012/0073791 A1 | 3/2012 | Dubois |
| 2012/0205081 A1 | 8/2012 | Terai et al. |
| 2013/0052735 A1 | 2/2013 | De Rosa et al. |
| 2013/0269906 A1 | 10/2013 | Riendeau |
| 2014/0014289 A1 | 1/2014 | Tan |
| 2014/0030495 A1 | 1/2014 | Cartier et al. |
| 2014/0033924 A1 | 2/2014 | Klingenburg et al. |
| 2014/0262125 A1 | 9/2014 | Erb et al. |
| 2014/0363600 A1 | 12/2014 | Dooley et al. |
| 2015/0000863 A1 | 1/2015 | Klingenburg et al. |

FOREIGN PATENT DOCUMENTS

| | | |
|---|---|---|
| CA | 2 798 892 | 7/2013 |
| CN | 102232015 | 11/2011 |
| DE | 34 30 204 | 2/1986 |
| DE | 19853526 A1 | 5/2000 |
| DE | 10 2006 004 513 | 8/2007 |
| DE | 10 2010 052 059 | 5/2012 |
| DE | 102011010651 A1 | 8/2012 |
| DE | 102011105926 A1 | 1/2013 |
| DE | 10 2011 110 862 | 2/2013 |
| EP | 0012491 A1 | 6/1980 |
| EP | 0529801 B1 | 3/1996 |
| EP | 0720720 B1 | 1/1998 |
| EP | 0666973 B1 | 2/1998 |
| EP | 0560630 B1 | 11/1998 |
| EP | 1312870 A2 | 5/2003 |
| EP | 1 873 470 | 1/2008 |
| EP | 1713853 B1 | 8/2008 |
| EP | 2 053 335 | 4/2009 |

(56) References Cited

FOREIGN PATENT DOCUMENTS

| | | |
|---|---|---|
| EP | 2169339 | 3/2010 |
| EP | 2435171 A1 | 4/2012 |
| EP | 2618090 | 7/2013 |
| EP | 2829834 | 1/2015 |
| EP | 2829836 | 1/2015 |
| GB | 2417315 A | 2/2006 |
| JP | 58-124196 A | 7/1983 |
| JP | 58-124521 A | 7/1983 |
| JP | 08219676 | 8/1996 |
| JP | 08-511614 | 12/1996 |
| JP | 04-84046 | 3/2004 |
| JP | 2005282907 | 10/2005 |
| JP | 2006-521004 | 9/2006 |
| JP | 2009052873 | 3/2009 |
| JP | 2013148335 | 8/2013 |
| RU | 2618736 | 5/2017 |
| WO | WO 94/29650 | 12/1994 |
| WO | WO 9509338 | 4/1995 |
| WO | WO 97/03324 | 1/1997 |
| WO | WO 2000069615 A2 | 11/2000 |
| WO | WO 01/27552 | 4/2001 |
| WO | WO 2002009850 A2 | 2/2002 |
| WO | WO 02/072242 | 9/2002 |
| WO | WO 2004/086547 | 10/2004 |
| WO | WO 2005012402 A1 | 2/2005 |
| WO | WO 2005014276 A1 | 2/2005 |
| WO | WO 2007/116567 | 10/2007 |
| WO | WO 2008/037079 | 4/2008 |
| WO | WO 2008089484 A1 | 7/2008 |
| WO | WO 2008/155810 | 12/2008 |
| WO | WO 2009137678 A1 | 11/2009 |
| WO | WO 2010/132983 | 11/2010 |
| WO | WO 2012050860 A1 | 4/2012 |
| WO | WO 2012107156 A1 | 8/2012 |
| WO | WO 2013/091099 | 6/2013 |
| WO | WO 2014011535 A1 | 1/2014 |
| WO | WO 2014043011 A1 | 3/2014 |
| WO | WO 2014/098375 | 6/2014 |
| WO | WO 2015/011544 | 1/2015 |

OTHER PUBLICATIONS

International Search Report and Written Opinion in corresponding PCT Application No. PCT/IB2014/001355, dated Jan. 5, 2015.
International Search Report and Written Opinion in corresponding PCT Application No. PCT/IB2014/001356, dated Jan. 5, 2015.
Final Office Action in U.S. Appl. No. 13/744,917, dated Apr. 23, 2015.
Non-Final Office Action in U.S. Appl. No. 13/744,917, dated Sep. 14, 2015.
Non-Final Office Action in U.S. Appl. No. 13/744,917, dated Nov. 18, 2014.
Non-Final Office Action in U.S. Appl. No. 13/744,917, dated Dec. 30, 2016.
Final Office Action in U.S. Appl. No. 13/744,917, dated Apr. 8, 2016.

HEAT / ENTHALPY EXCHANGER ELEMENT AND METHOD FOR THE PRODUCTION

Priority Statement Valid Under 35 U.S.C S.119 (e) & 37 C.F.R. S.1.78

The present application is a U.S. national phase application under 35 U.S.C. § 371 of International Patent Application No. PCT/CA2014/000566, filed Jul. 11, 2014, which claims priority based upon the prior U.S provisional patent applications entitled "HEAT EXCHANGER ELEMENT AND METHOD FOR THE PRODUCTION", application number 61/856,306, filed Jul. 19, 2013, in the name of Marcel RIENDEAU, the disclosures of all of which are hereby incorporated by reference in their entireties. The International Application was published in English on Jan. 22, 2015 as WO 2015/006856.

TECHNICAL FIELD

The present invention relates to heat exchangers and, more particularly, to heat exchanger elements.

BACKGROUND

It is state of the art to use different kinds of heat exchangers for different purposes. Usually, heat exchangers are used to recover heat energy from one fluid or medium into another one. This kind of heat energy is called sensible energy. The heat energy or sensible energy of one fluid, normally air, is recovered into another one which is running adjacent, e.g. parallel, counter or cross flow, to the first where the fluid is at lower temperature. By inverting fluid flows, the exchange between the two will generate a cooler fluid. Heat exchangers used for sensible energy recovery are usually made of metal or plastic plates. There are different types as there can be cross flow, parallel flow or counter flow configurations. The plates are defining flow channels between themselves so that the fluids can flow between the plates. Such devices are e.g. used in residential and commercial ventilation (HRV).

Another type of energy exchangers refers to the so called latent energy, which is contained in the air moisture. To exchange the latent energy, it is known to use desiccant coated metal or plastic substrates or membranes made from desiccant impregnated cellulose or polymer. Between plates made from cellulose or polymer, air passages are defined or created to allow the fluids to pass along the surface of the plates, thereby transferring moisture from one fluid to the other one. As the membranes usually have no structural strength, it is known to combine the membranes with frames or grids which thereby define openings between the membranes.

In case of a combination of the above, the energy exchangers are called enthalpy exchanger. Those enthalpy exchangers allow for the exchange of sensible and latent energy, resulting in total energy recovery.

Membrane materials as currently available are delivered by the roll. The membrane material is the most critical part of an enthalpy exchanger. The membrane must be fixed and sealed to a kind of grid or frame and arranged in a way to allow for a fluid to flow between each membrane layer. So, it is obvious that enthalpy exchangers of the known art are a compromise. They will usually lose in sensible energy to gain in latent energy as a result of the selective scope and characteristics of currently used membranes.

Such a heat exchanger built from respective elements is e.g. WO 02/072242 A1. On grids respective membranes made of fibers are positioned. The grids are stacked thereby altering the direction of the plates in order to create different air flow directions.

The present invention aims at improving on some of the shortcomings of current heat/enthalpy exchangers.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

A first aspect of the present invention is directed to a method for the production of heat/enthalpy exchanger elements comprising the steps of perforating a flat plate element according to a predetermined perforation pattern within the plate outer dimensions, applying to at least one side of the plate element a thin polymer film with water vapor transmission characteristics (e.g., with high Water Vapor Transfer Rate (WVTR), which is the steady state rate at which water vapor permeates through a film at specified conditions), and forming the plate element into a desired shape exhibiting a corrugation pattern, whereby the polymer film is formed into the same corrugation pattern shape as that of the plate element.

Optionally, the method may be characterized in that the plate element is a plastic plate.

The method may also be characterized in that the plate is perforated using at least one of needles, pins, die and punch, laser, or the like.

The method may be characterized in that steps of applying to at least one side of the plate element a thin polymer film and forming the plate element into a desired shape exhibiting a corrugation pattern are performed simultaneously.

Optionally, the method is characterized in that the polymer film is bonded, preferably heat bonded, to the plate element during the forming step of the plate element. The method may also be characterized in that the polymer film is made of a sulfonated copolymer, preferably a block copolymer. Additionally, the method may be characterized in that the spatial frequency of any corrugations running in parallel within the corrugation pattern and/or the perforation density (i.e. number of perforations per unit area) is varied, preferably in border areas, to improve frost resistance.

A second aspect of the present invention is directed to a heat/enthalpy exchanger element, preferably produced using the method defined as the first aspect of the invention which includes a plate element with a shape exhibiting a predetermined perforation pattern and a predetermined corrugation pattern. At least one side of the plate element is covered by a thin polymer film with water vapor transmission characteristics.

Optionally, the heat/enthalpy exchanger element is characterized in that the thin polymer film is bonded, preferably heat bonded, to the plate element. The heat/enthalpy exchanger element may be characterized in that the perforated area of the plate element includes corrugated or embossed surface areas.

Additionally, the heat/enthalpy exchanger element may be characterized in that the width of corrugations in the border areas of the plate element is larger than the width of corrugations in the middle area of the plate element and/or the perforation density (i.e. number of perforations per unit area) in a border area of the plate element is larger than in the middle area of the plate element. The heat/enthalpy exchanger element may be characterized in that the corrugations are oriented to guide a fluid flow.

Optionally, the heat/enthalpy exchanger element is characterized in that the perforations are openings of diverse shapes and sizes (in a range of 70 $\mu m^2$ to 3.0 $mm^2$), preferably providing a total open area of no less than 50% of the total plate surface within its border area.

The heat/enthalpy exchanger with at least three plates like heat/enthalpy exchanger elements fixed to each other in parallel orientation to form two fluid paths allowing fluids to flow there through, may be characterized in that the plate like heat exchanger elements are elements according to the abovementioned features of the second aspect of the invention. Additionally, the heat/enthalpy exchanger may be characterized in that the heat/enthalpy exchanger elements are fixed to each other by means of welding such as laser welding or ultrasonic welding, or by means of gluing.

A third aspect of the present invention is directed to a method for the production of heat/enthalpy exchanger elements comprising the steps of perforating a flat plate element according to a predetermined perforation pattern within the plate outer dimensions, forming the plate element into a desired embossing pattern and geometrical shape and applying to at least one side of the plate element a polymer film with water vapor permeation characteristics.

Optionally, the method is characterized in that for the plate metal foil, preferably aluminum foil, is used. The method may also be characterized in that the plate is perforated using at least one of pins, die and punch, laser, or the like.

The method may be characterized in that the forming and the cutting to shape in step b) is performed (by embossing) according to progressive stamping techniques on a metal stamping press with dies and tools. The method may further be characterized in that the polymer film is made of a block copolymer.

Optionally, the method is characterized in that the polymer film is bonded, preferably heat bonded, to the formed plate element.

A fourth aspect of the present invention is directed to a heat/enthalpy exchanger element, preferably produced using the method as defined as the third aspect of the present invention. The heat/enthalpy exchanger includes a plate element with a shape exhibiting a predetermined perforation pattern. At least one side of the plate element is covered by a thin polymer film with water vapor transmission characteristics.

Optionally, the heat/enthalpy exchanger is characterized in that the plate element is made of metal foil, preferably aluminum foil. The heat/enthalpy exchanger element may also be characterized in that the border areas of the plate element are not perforated. Additionally, the heat/enthalpy exchanger may be characterized in that the shape of the plate element exhibits an embossing pattern.

The heat/enthalpy exchanger may be characterized in that the thin polymer film is bonded, preferably heat bonded, to the plate element. Optionally, the heat/enthalpy exchanger is further characterized in that the plate element has a border non-perforated area which allows gastight connection to another similar plate element.

Additionally, the heat/enthalpy exchanger element may be characterized in that the perforations are openings of diverse shapes and sizes (in a range of 200 $\mu m^2$ to 18.0 $mm^2$) and preferably providing a total open area of no less than 50% of the total plate surface within its border area.

The heat/enthalpy exchanger with at least three plates, like heat/enthalpy exchanger elements, fixed to each other as a stack to form two fluid paths allowing fluids to flow there through, may be characterized in that said plates are elements according to the heat/enthalpy exchanger defined as the fourth aspect of the invention as defined above.

Optionally, the heat/enthalpy exchanger may be characterized in that the heat/enthalpy exchanger elements are fixed to each other using at least one of crimping, welding and gluing processes.

BRIEF DESCRIPTION OF THE DRAWINGS

Further features and exemplary advantages of the present invention will become apparent from the following detailed description, taken in conjunction with the appended drawings, in which.

DETAILED DESCRIPTION

Figure 1:
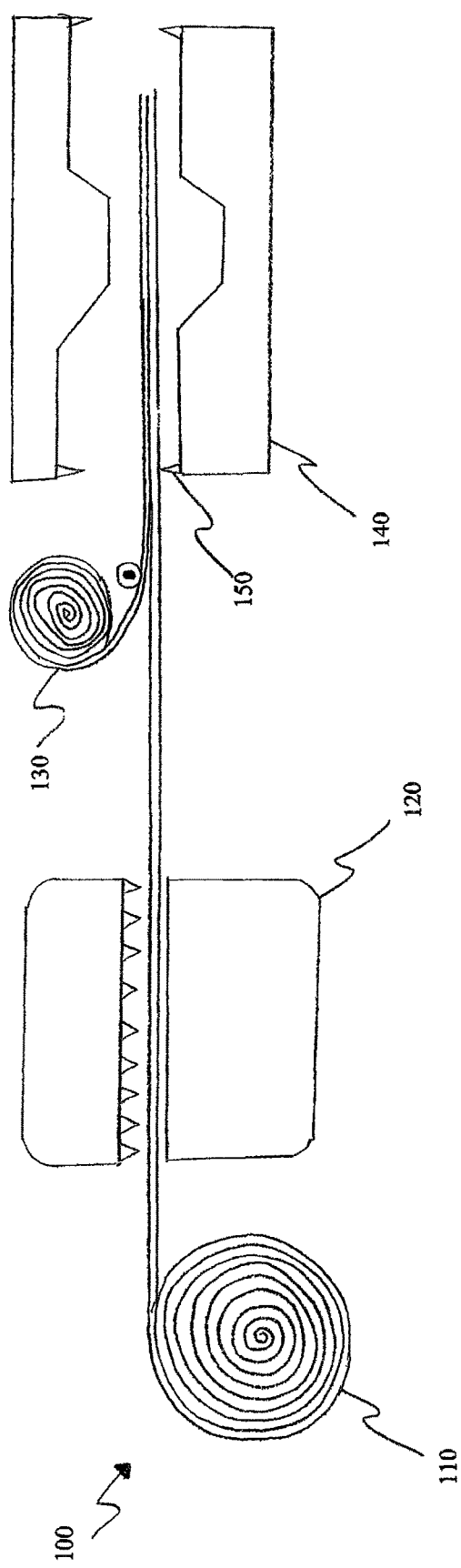
FIG. 1 is a side view of a first exemplary process for manufacturing an exemplary heat/enthalpy exchanger element in accordance with the teachings of the present invention.

U.S. patent application Ser. No. 13/744,917 published under US2013/0269906 and Patent Application serial number EP12000365 published under EP2618090 are herein incorporated by reference.

The present invention aims at providing heat/enthalpy exchanger elements and heat/enthalpy exchangers as well as a method for the production of heat/enthalpy exchanger elements. The inventive heat/enthalpy exchanger elements allows for the creation of heat/enthalpy exchangers whereby the efficiency of sensible energy exchange and latent energy exchange can be varied and controlled and may especially improve total energy efficiency and frost resistance.

In accordance with embodiments of the present invention, a method is provided for the production of heat/enthalpy exchanger elements including a) perforating an unformed plate element with defined outer dimensions in any desired area and in any desired dimension, b) covering at least one side of the unformed plate element with a thin polymer film with latent energy exchange characteristics and c) forming the plate element into a desired shape and a pattern of corrugations and/or embossing. Notably, depending on choices made for the production of heat/enthalpy exchanger and choices made in the materials used for the plate element, the operations b) and c) may be performed in a different order. More specifically, when the plate element is made out of plastic, tests performed indicate that, provided the temperature is set and controlled properly, b) may be performed before c) leading to satisfactory results whereas, when the plate element is made out of aluminum, tests performed indicate that performing c) before b) leads to better results. When the plate element is made out of plastic and aluminum, tests would need to be performed to determine in what order the operations a), b) and c) could be performed considering a necessary assembly step of the plate element. In addition, while constraints would thereby be added to the perforating operation, operations a) and c) (provided that b) is performed subsequently) may also be interchanged.

In accordance with embodiments of the present invention, a heat/enthalpy exchanger element is provided comprising a plate element with defined outer dimensions and corrugations and/or embossing in the area within a border, the plate element having perforations in any desired area and in any desired dimension, and at least one side of the plate element being covered by a thin polymer film with latent energy exchange characteristics.

In accordance with embodiments of the present invention, a heat/enthalpy exchanger is provided that comprises an heat/enthalpy exchanger element as described above.

In accordance with at least some embodiments of the present invention, exemplary advantages may be provided. For instance, an exchanger element may provide enough structural strength and density to create air flow channels for any type of cross flow and/or counter flow energy exchanger, thereby allowing for the use of a structurally strong material which is good for sensible energy exchange, on the other hand by size and number of perforations or openings or holes it is possible to define an area which is covered by a thin polymer film with latent energy exchange characteristics. For instance, the polymer may be formed in many different ways including a liquid polymer solution (dispersion) being sprayed over the exchanger element to form the polymer film, the exchanger element being dipped in liquid polymer to form the polymer film, the polymer dispersion being applied by serigraphy, or forming the polymer film by any lamination method.

As skilled persons will readily recognize, the efficiency of sensible energy exchange on one hand and latent energy exchange on the other hand can be defined, controlled and adapted to the respective needs of the environment (dry air, humidity, outside temperature and the like).

According to the invention, a plate element can be made of aluminum or plastic or combinations thereof. The element can be provided with corrugations or embossing. The plate element forming patterns can be designed to optimize the efficiency to pressure drop ratio. The corrugations can be chosen to allow for creating flow channels between similar plates when those are stacked together. By the definition of the corrugation, one advantage may be the enhancement of the surface which is available for energy transfer. This can be built up as large as possible and can even reach an increase of 100% and more of the corrugated area. Furthermore, the corrugations can be designed in a way to allow for the easy arrangement of counter flow or cross flow configurations, e.g. by choosing oriented corrugations and alternating the position of the plate.

According to the invention, plate elements are perforated in any desired area and in any desired dimension. Depending on the applied plate material, appropriate perforation methods may be used.

The perforations can advantageously be performed prior to the plate forming step, which allows for a fast and convenient perforation step. That way plates can be perforated more easily and furthermore perforated in any desired area.

Alternatively, perforation can be performed during the forming step if the respective material allows for progressive stamp forming techniques for metal plates and thermoforming for plastic plates. The perforations may also be performed after the plate forming step, provided that the perforations are performed in accordance with the physical characteristics of the formed plate.

In addition, in some embodiments, it would be possible to perform some of the perforations prior to the plate forming step and some more perforations after the plate forming step.

Preferably, the border areas of the plate elements are not perforated, to allow for a gas tight fixing, e.g. welding, of the plate elements when stacking plate elements to form the plate exchanger. Preferably, the border area is not perforated in a range of 5 to 20 mm, more preferably 10 to 20 mm, from the outer dimensions of the plate element.

The border of the plate defines an area where similar plates can be fixed together in an appropriate way. This can be welding, e.g. laser welding, ultra sound welding and/or folding, crimping and the like. This contributes to the structural integrity of the package (complete heat/enthalpy exchanger). The non perforated border area can be flattened, tongue/groove system, profiled or rimmed to allow for a tight sealable connection between plates.

The polymer film can be made of a polymer according to the state of the art, e.g. like the product "Aquivion", a trademark of Solvay or "Nexar", a trademark of Kraton.

The material can be e.g. a ionomer in form of a copolymer produced from tetrafluoroethylene, $C_2F_4$, and Ethanesulfonyl fluoride, 1,1,2,2-tetrafluoro-2-[(trifluoroethenyl)-oxy], $C_2F_3$—O—$(CF_2)_2$—$SO_2F$, sulfonated block copolymer.

However, the polymers can be adapted to the desired characteristic and features.

Skilled persons will readily recognize that the amount or efficiency of latent energy recovery depends on the surface provided by the holes or perforations, their shapes and their locations. So it is possible to adapt the heat exchanger plates to the environmental and functional conditions. Given an expected enthalpy behavior, the thickness of the polymer film and the size of the openings may be determined. It is expected that the permeability of the plates to water vapor increases as the thickness of the polymer film decreases.

By using the proven heat transfer materials as the structural elements for the enthalpy membrane, high sensible efficiency is ensured. By defining the perforations and choosing the polymer, high latent recovery is ensured.

The polymer can be combined with additives to manifold and magnify its attributes. It can be, for instance, efficiently anti-bacterial and can meet fire resistance requirements (UL). Its structure, formulation and viscosity can be adjusted to achieve the optimal tunable exchange features of the plate allowing as high a moisture exchange as possible.

In accordance with some embodiments of the present invention (e.g., when the plate element is made completely or partly of plastic or other thermally malleable material in a range of temperature compatible with a chosen polymer), the polymer film is applied to one side of the unformed plate element prior to the forming step of the plate element, thereby completely covering the unformed plate element as well as the holes or perforations. Therefore the perforations are not limited in size and can be chosen in any desired dimension.

More specifically, in these exemplary embodiments, subsequently to applying the polymer film to the unformed plate element, the unformed plate element is formed to exhibit the aforementioned features, e.g. corrugations, side walls, flat border areas and the like. At the same time, the polymer film is formed into the same shape as the plate element and can be permanently bonded to the plate element by means of heating, gluing or combination of both.

In accordance with some embodiments of the present invention (e.g., when the plate element is made completely or partly of aluminum or other material unlikely to preserve the characteristics of the polymer film, while being formed), the polymer film may be bonded, especially vacuum bonded and pressed, and may be further bonded using, for example, a glue, to the plate element after the forming step.

According to alternate embodiments of the invention, the perforations may not be permanently covered by a polymer film, but rather filled with a film forming polymer solution, which can be the same material as the one used for the casted polymer film, and subsequently cured. Advantageously the polymer may be supplied as dispersion. In such state, liquid polymer develops viscosity rapidly and needs to be constantly monitored and adjusted regularly at predefined value (cP). The polymer solution can be brought to the plate by thereby filling or covering the holes or perforations by way of spray, dip, serigraphy, Dot Matrix Applicator or any lamination method.

In exemplary embodiments where the polymer film is applied to one side of the unformed plate element prior to the forming step of the plate element, certain precautions may be required to ensure that the polymer film is correctly applied and maintains its characteristics.

Polymer compositions that are compatible with the present invention typically maintain their desired characteristics in a limited range of temperature. Even though the film may appear to be correctly bonded to the plate element, if the forming operation is performed outside of the limited range of temperature, the performance of the resulting plate element and/or heat/enthalpy exchanger may be affected. The thermo formable material chosen for the plate element needs to be correctly chosen considering the limited range of temperature.

When it is determined that the polymer film should be applied after the forming step (e.g., temperature of the forming step too high for the polymer to maintain its desired characteristics) the unformed, yet perforated, plate element may be covered with a thermo formable web to temporarily seal the holes. The thermo formable web does not bond to the plate element during the forming step and can easily be removed thereafter. Subsequently after removing the web, the holes or perforations can be covered or filled with the polymer film or polymer solution, as described herein.

Skilled persons will readily recognize that the sensible energy transfer and the latent energy transfer capabilities of the heat/enthalpy exchanger are tunable and adjustable. The plates are adaptable to environmental conditions by the variable mosaic geometry of the perforations. For instance, an exchanger can be designed to operate at temperature lower than −10° C. delaying ice build up by choosing the right position of the perforations and polymeric treatment of the constitutive plates combined to most suitable gas flow channels sizes, shapes and forms. In some embodiments, tuning of the layout of different plate elements may allow for different gas flows within a heat/enthalpy exchanger, such that the gas flows are not necessarily equivalent to one another or symmetrical. The rate of water vapor permeation can thus be made different from one area of the heat/enthalpy exchanger compared to another. Such flexibility may allow for improved performance across interrelated functions and characteristic of the heat/enthalpy exchanger such as total energy recovery and resistance to frost.

However, under harsh conditions, especially plate exchangers tend to freeze in the narrow border channels, thus decreasing the exchange efficiency of the plate exchanger. This is due to a reduced flow velocity (or rate) of fluids in said border channels.

In order to overcome this issue, the width of corrugations in the border area of the plate element may be set to be larger compared to the width of the corrugations in the middle area of the plate element. An exemplary advantage of this configuration is that the width of the resulting flow channels in the border area is increased and as a result the fluid flow rate is increased, thus preventing or delaying ice from building up.

In some embodiments, the rigidity of the structural elements could make the plate and thereby the polymer film capable of handling pressure differential more than 1 Kpa within the exchanger or at least equal to that of the supporting plate element itself. This exemplary advantage opens the door to larger exchanger constructions for commercial applications.

By setting the different parameters of the plate element production in accordance with the teachings of the present invention, energy exchanger plates allowing sensible as well as latent energy exchange may be obtained. The design and the adaptability of the plates allows for the construction and design of heat/enthalpy exchangers which may be optimized with regard to the technical requirements and/or the environmental conditions.

Stamped, corrugated, embossed metal (e.g., aluminum or stainless steel for instance), resin based plates and/or vacuum formed plastic plates (e.g., polystyrene or ethylene or other thermo formable plastics, for instance) can be made using proven automation technologies including the assembly (e.g. by vacuum grip, sealing solvent, laser welding, ultra sound welding, folding, crimping, etc.), to obtain packages of superposed rigid plates. The plate elements may thus be washable, fire retardant, antibacterial and sealed (e.g., gas tight). They may provide advantages necessary to create heat/enthalpy energy exchangers adapted to the requirements, combining heat and moisture recovery.

The plate perforation, too, can be performed by pre-programmed continuous laser processes, by mechanical systems like needle-roller, die punch and the like, or chemical etching processes. Skilled persons will recognize that the perforation operation may be performed in many different ways without affecting the present invention.

Figure 2:
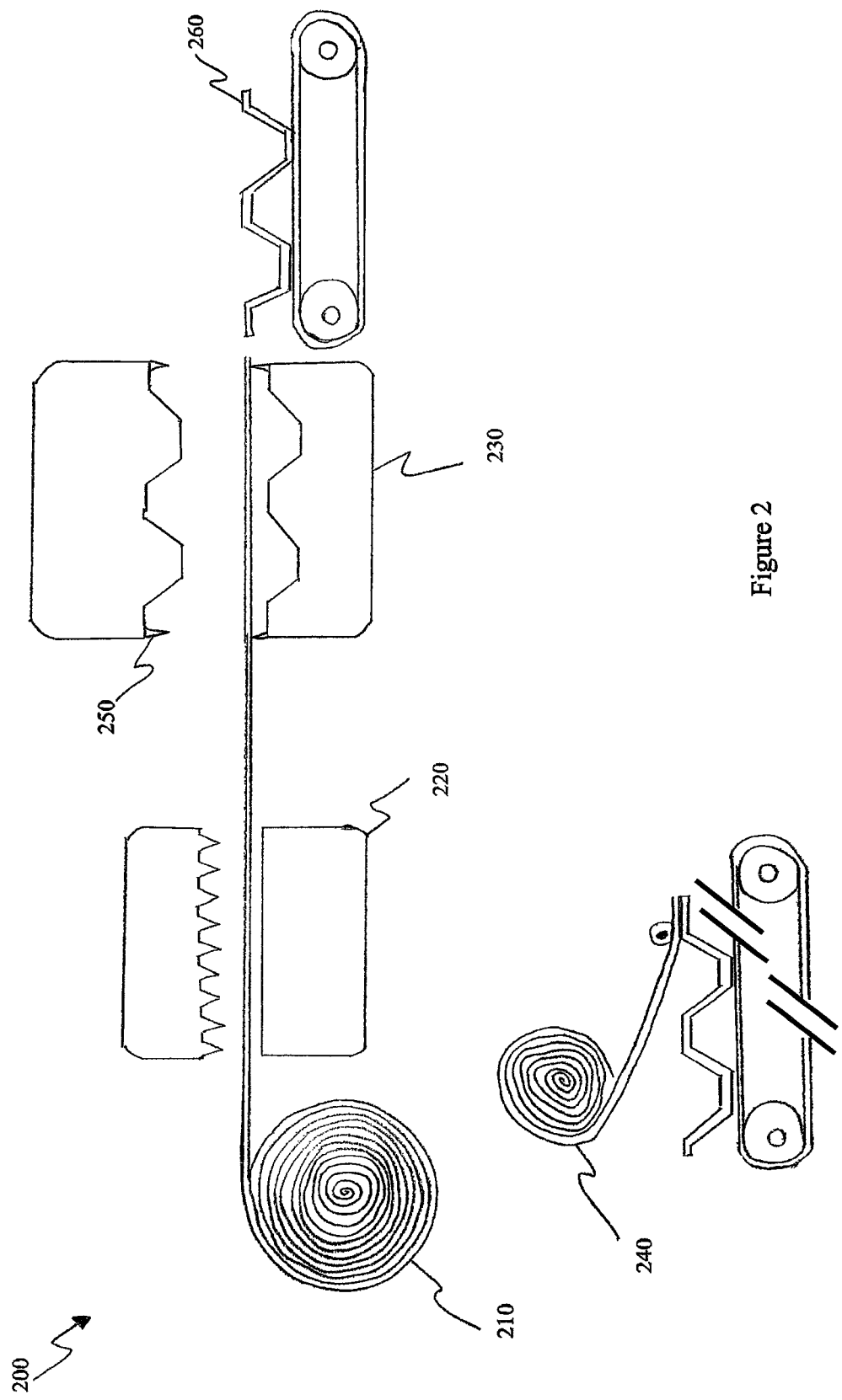
FIG. 2 is a side view of a second exemplary process for manufacturing an exemplary heat/enthalpy exchanger element in accordance with the teachings of the present invention.
Figure 3:
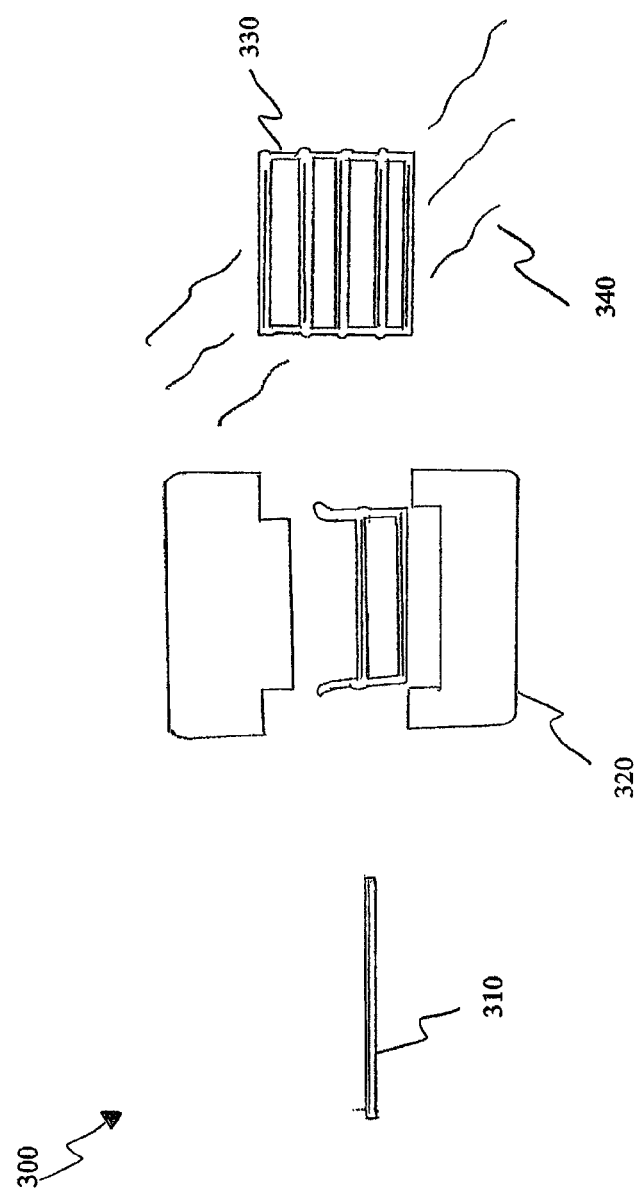
FIG. 3 is a side view of a first exemplary process for manufacturing an exemplary heat/enthalpy exchanger in accordance with the teachings of the present invention.
Figure 4:
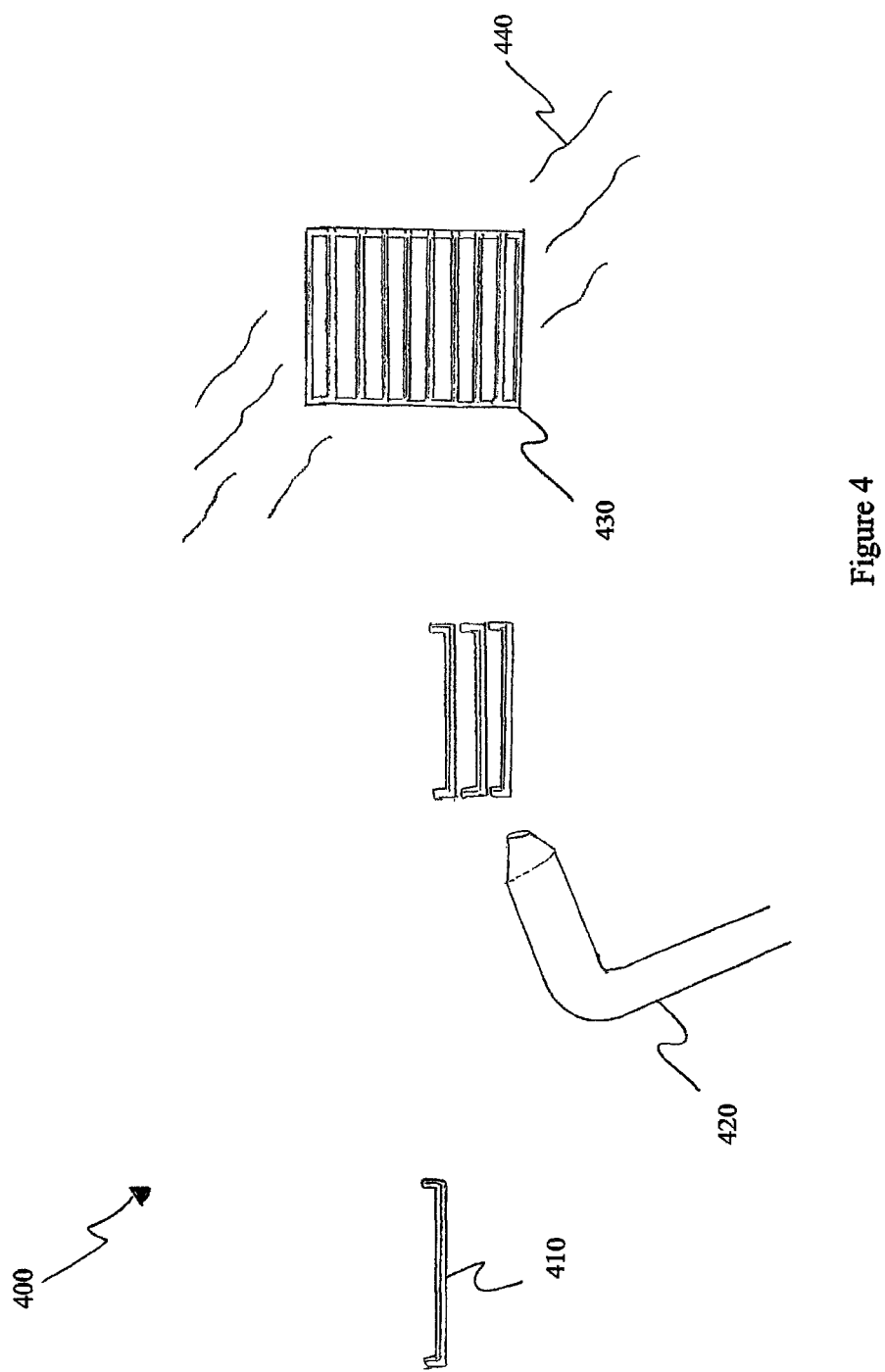
FIG. 4 is a side view of a second exemplary process for manufacturing an exemplary heat/enthalpy exchanger in accordance with the teachings of the present invention.
Figure 5:
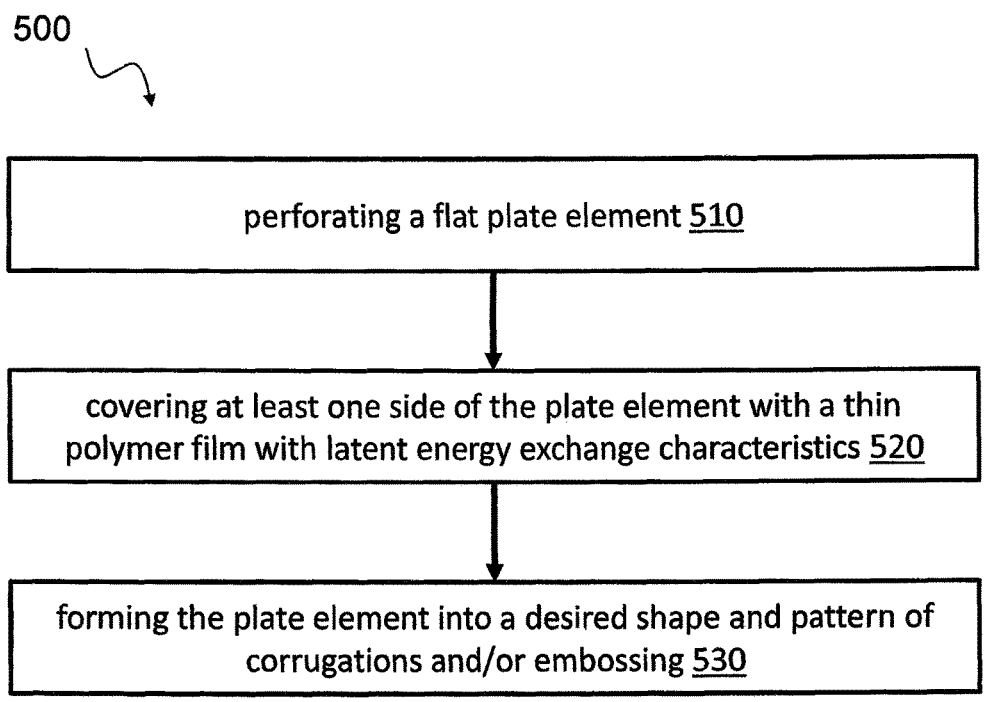
FIG. 5 is first a flow chart of a first exemplary method in accordance with the teachings of the present invention.
Figure 6:
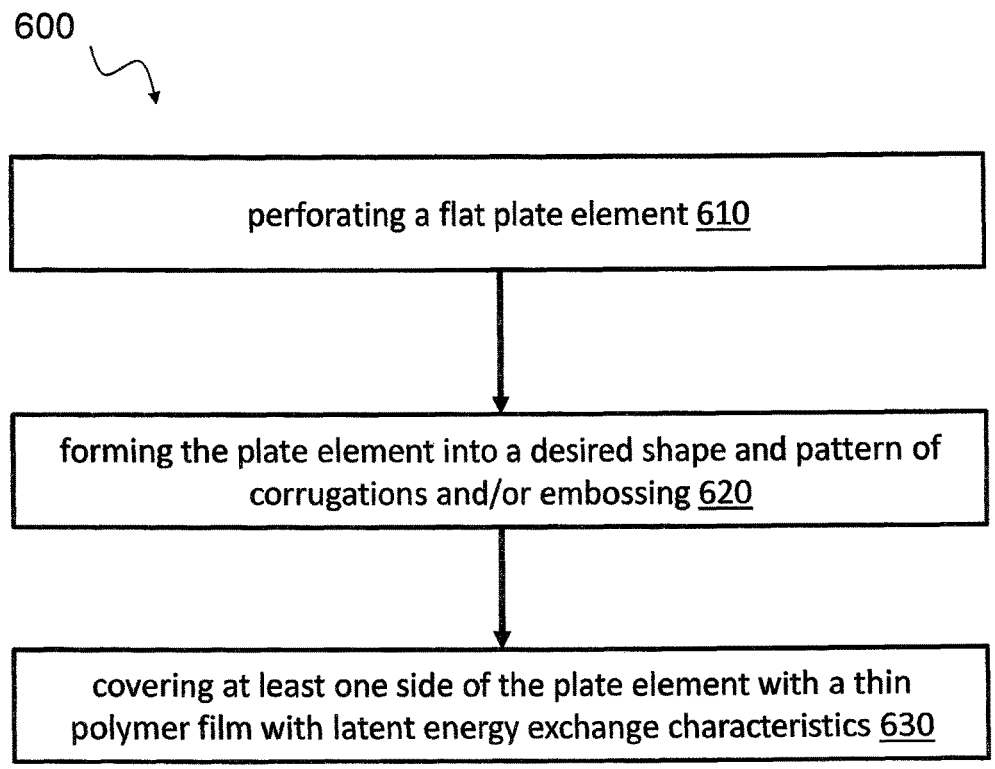
FIG. 6 is second a flow chart of a second exemplary method in accordance with the teachings of the present invention.

Reference is now made to the drawings in which FIG. 1 and FIG. 2 show respectively side views of exemplary processes 100 and 200 for manufacturing exemplary heat/exchanger elements in accordance with the teachings of the present invention, FIG. 3 and FIG. 4 show respectively side views of exemplary processes 300 and 400 for manufacturing an exemplary heat/enthalpy exchanger in accordance with the teachings of the present invention and FIG. 5 and FIG. 6 show respectively flow charts of exemplary methods 500 and 600 in accordance with the teachings of the present invention. FIGS. 1 through 4 are not to scale.

Reference is now made concurrently to FIG. 1 and FIG. 5. In the depicted example, a continuous feed of unformed plate element 110 made of plastic is provided on a roll as a foil. Examples of thermoformable plastics include ABS (Accrylonitrile-butadiene-styrene), HDPE (High-Density Polyethylene or Acrylic and the like depending on desired features for specific environmental requirements such as resistance to fire, to salt water, etc.

The unformed plate element 110 is fed to a perforation device 120 to carry out the perforation step 510. The perforation device 120 may be, for example, a die punch press, a needle roller machine or a laser grid. A skilled person in the art will readily recognize that the perforation device 120 may be other devices for perforating the plate material element 110 without diverging from the teachings of the present invention. Even in the present case, plate area is perforated with a selective pattern leaving border areas non perforated to allow for gas tight welding of formed plate elements when stacking formed plate elements to form the plate exchanger, which is not shown in FIG. 1.

In some embodiments, instead of perforating a continuous foil of unformed plate element, step 510 may comprise providing a wire mesh (e.g., net-like, screen-like, chicken wire-like). with desired permeability/perforation characteristics to achieve a similar result. The wire mesh may further be maintained to a frame (e.g., welded, glued, etc.).

Subsequently to the perforation step 510, one side of the now perforated but still unformed plate element 110 is completely covered by a thin polymer film 130 in a covering step 520. The polymer film 130 may be formed of a sulfonated block copolymer. The unformed plate element may additionally be covered by a temporary thermo-formable protective backing liner. In an alternate embodiment the polymer film 130 may be laminated to the temporary thermo-formable protective backing liner which is laminated to the polymer film 130, where both the polymer film 130 and the laminated protective backing liner are provided on one roll before covering the unformed plate element 110.

In an alternative embodiment, the protective backing liner may be provided on a separate roll, other than the roll providing the polymer film 130. The polymer film 130 may then be added by, for example, lamination, to the now perforated but still unformed plate element 110 and the temporary backing liner may concurrently, or subsequently, be added to the polymer film 130 covering the perforated yet unformed plate element 110. In an alternative embodiment, the casted polymer film 130 may be provided as a roll or may instead be a liquid solution which is applied onto the unformed plate element 110 using, for example, spray, serigraphy or dip process or dot matrix applicator and may be followed by curing (e.g. UV curing). In this alternative embodiment, the temporary thermo-formable protective backing liner is added to the unformed plate element 110 prior to applying the liquid polymer blocking the perforations in the perforated plate element 110.

In another alternative embodiment, the combination of the perforated unformed plate element 110 and the polymer/ liner 130 may be put back as a continuous composite foil on a roll. For the covering step 520, in an alternative embodiment, a perforated unformed plate element may be provided on a roll.

Subsequently to the covering step 520, the now perforated and covered unformed plate element 110 is transferred to a forming device 140, which is embodied by a vacuum and pressure thermoforming device in the example of FIGS. 1 and 5. In the following forming step 530, the border areas, fluid inlets and outlets and corrugations are formed into the plate element 110. Additionally, the thin polymer film 130 is bonded to the plate element 110 using heat. The thermoforming device 140 may achieve heat bonding combining heat and a vacuum from bottom and/or pressure from top for forming the plate element while maintaining the polymer film 130 in place above unformed plate element 110 during the forming step 530. Techniques used for heat bonding may be, for example, "heat sealing" or "hot plate welding". A bonding means, applied before the forming step 530, such as, for example, a bonding chemical, certain forms of glue, or adhesives reacting to ultraviolet rays or low amplitude ultrasonic (15 to 45 KHz) may be used to further the bonding of the unformed plate element 110 to the polymer film 130 during the forming step 530 resulting in a composite unformed plate element. In a preferred embodiment, the forming step 530 may also include adding guiding holes on the unformed plate element 110 using a guiding hole device 150 (or a similar apparatus for leaving a detectable reference mark). In an alternative embodiment, adding the guiding holes may be done after the forming step 530. The added guiding holes may be for orienting the unformed plate element 110 before cutting.

In some embodiments, the single cavity mold of the forming device 140 may be composed of two complementary functions (e.g., with individually controllable) heating elements. Both elements may generate heat. A bottom element may be used for vacuum forming the unformed flat plate element 110 thereonto while a top heating element provides heat to the pressure forming function pressing the polymer film against the plate element 110 being formed to complete the forming step 530. The top and bottom elements may be heated at a different temperature (e.g., lower at the bottom element to respect the temperature range of the polymer film.)

While the back liner may be peeled or otherwise removed from the plate element at any step after the forming step 530, it may further be used to protect the polymer film on the plate element throughout following steps. In a preferred embodiment, the temporary backing liner is removed before stacking the formed plate elements.

In an alternative embodiment, the covering step 520 and the forming step 530 may be done congruently, where the perforated plate element 110 is being covered by the polymer film 130 and the perforated plate element 110 and the polymer film 130 are being bonded and formed using a vacuum thermoforming device.

In the example of FIG. 1 and FIG. 5, border areas of the plate element 110 are being formed in non-perforated areas. Fluid channels (e.g., fluid outlets/fluid inlets), may also be formed so that, once assembled in a heat/enthalpy exchanger, different plate elements provide appropriate channels for gas/fluid circulation. Skilled persons will readily understand that, while perforations to be covered and sealed are depicted in a central portion of the plate element 110, they could be located on any surface of the formed plate elements 110 facing each other to form gas channels whether the formed plate elements 110 are corrugated or not.

Through the forming step 530, the polymer film 130 is formed into the exact same shape as the plate element 110 and is permanently bonded to the plate element 110, due to the heat and the corrugations, which is applied by the forming device 140.

The formed, yet uncut, plate element 110 is then cut to a final size using, for example, cutting dies. A skilled person will recognize that other means may be used for cutting, such as the use of a laser, without diverging from the teachings of the present invention.

The plate element 110 may then be tested for the quality and/or integrity of the coverage by the polymer film 130 of all openings of the plate element 110 as well as the efficiency of the bonding. For instance, the testing may be done using a camera through, a real-time industrial visual inspection. Additional steps may also be performed for testing the plate element 110 for resistance to predetermined pressure. In a preferred embodiment, the testing for resistance to predetermined pressure may be performed in a range of 500 Pa to 5 KPa depending on the specified use and operating conditions of the intended exchanger.

Reference is now made concurrently to FIG. 2 and FIG. 6. In the depicted example, a continuous feed of unformed plate element 210 made of plastic or metal (e.g. aluminum) and provided on a roll as a foil. The unformed plate element 210 is fed to a perforation device 220 to carry out the perforation step 610. The perforation device 220 may be, for example, a die punch press, a needle roller machine or a laser grid. A skilled person in the art will readily recognize that the perforation device 220 may be other devices for perforating the plate material element 210 without diverging from the teachings of the present invention. In the discussed example, plate area is perforated with a selective pattern (not shown in FIG. 2) leaving border areas non perforated to allow for gas tight welding of formed plate elements when stacking formed plate elements to form the plate exchanger. Skilled people will recognize that arrangements other than welding at border areas would still be compatible with the teachings of the present invention.

In some embodiments, instead of perforating a continuous foil of unformed plate element 210, step 610 may comprise providing a wire mesh (e.g., net-like, screen-like, chicken wire-like) with desired permeability/perforation characteristics to achieve a similar result. The wire mesh may further be maintained to a frame (e.g., welded, glued, etc.).

Subsequently to the perforation step 610, the perforated, yet uncut, plate element 210 is transferred to a forming device 230. When the uncut perforated plate element 210 is made of plastic, the forming device 230 may be embodied by a vacuum thermoforming device for using heat and vacuum for shaping the perforated plate element 210. In some embodiments, the vacuum thermoforming device may perform the perforation step 610 and the forming step 620 simultaneously (e.g., when a texture (e.g., array or needle-like structures) is provided in a bottom element of the thermoforming device to mold the perforations in the plate element 210).

When the uncut perforated plate element 210 is made of aluminum, the forming device 230 may be a mechanical (and possibly thermoforming) device, such as, for example, a hot stamping device, for forming the perforated plate element 210. Skilled persons will recognize that other means for forming the perforated plate element 210 may be used, such as hydroforming, without diverging from the teaching of the present invention. In the following forming step 620 (e.g., when the uncut perforated plate element 210 is made of metal), the uncut perforated plate element 210 is cut to individual plate elements with specific dimensions, corrugations and/or embossing. When the perforated plate element 210 is made of metal, the forming device 230 may comprise cutting elements 250 for cutting. A skilled person will recognize that other means may be used for cutting, such as the use of a laser, without diverging from the teachings of the present invention. Individual cut and perforated plate elements 260 are formed following the forming step 620. In an alternative embodiment, the cutting is done after the forming step 620 and before a covering step 630. In another alternative embodiment, the cutting, performed after the forming step 620, may be done during the covering step 630. When the perforated plate element 210 is made of plastic, the cutting of the perforated and formed plate element 210 may be done after the forming step 620, where the forming step 620 may comprise adding a guiding means to the perforated plate element 210, such as holes, for orienting the perforated and then formed plate element 210 for cutting.

In an alternative embodiment, when the unformed, imperforated and uncut plate element 110 is metal, the perforating step 610 and the forming step 620 may be performed in one single step, wherein, for example, a device may perforate, form and cut the unformed, imperforated and uncut plate element 210 (not shown), using for example, a progressive die forming process.

Following the forming step 620, the now perforated and formed plate element 260 is completely covered by a polymer film 240 in the covering step 630. The polymer film 240 may be formed of a sulfonated block copolymer. In a preferred embodiment, the polymer film 240 may be protected by a thermoformable temporary protective liner, where the temporary protective liner is laminated to the polymer film 240. The temporary liner is for protecting the polymer film during the covering step 630 and, in some embodiments, ensuring a seal between while the polymer film is vacuumed onto the perforated plate element 260. In a preferred embodiment, when the plate element 260 is made of metal, the temporary liner may only be removed during crimping of the composite formed plate elements 260 for the assembly of the heat/enthalpy exchanger. In an alternative embodiment, the temporary liner may be removed during the covering step 630 in which the thin polymer film 240 is bonded to the perforated and cut plate element 260 (not shown). The temporary liner may also be removed once the polymer film 240 covers and bonds to the perforated and cut plate element 210. Vacuum and/or heat may be used to form and bond the polymer film 240 to the cut and formed plate element 260. In a preferred embodiment, for strengthening the bond of the polymer film 240 to the formed plate element 260, before the use of vacuum and/or heat to form and bond the polymer film 240 to the formed plate element 260, a bonding means may be used which may be, for example, a bonding chemical, bonding glue, a form of heat bonding or an adhesive reacting to ultraviolet rays or low amplitude ultrasonic (15 to 45 KHz). In a preferred embodiment, a combination of bonding means may be used in order to strengthen bonding between the formed plate element 260 and the polymer film 240. In some embodiments, the polymer may be a liquid solution which is applied onto the formed plate element 210 using, for example, a spray, a dip process, a dot matrix fluid application and/or serigraphy and may be followed by a curing process (e.g. UV curing), where the temporary liner is added for blocking the perforations in the perforated and formed plate element 260.

In an alternative embodiment, cutting of the formed plate element 260 is performed after the covering step 630. The cutting of the formed plate element 260 may then takes into account the potentially increased sturdiness of the plate element 260 and potentially increased brittleness of the polymer film.

The plate element 260 may then be tested for the quality and/or integrity of the coverage by the polymer film 240 of all openings of the cut, formed and covered plate element 210 as well as the efficiency of the bonding. In a preferred embodiment, the testing is may be done using a camera through a real-time industrial visual inspection. Additional steps may also be performed for testing the plate element 210 for resistance to predetermined pressure. In a preferred embodiment, the testing for resistance to predetermined pressure may be performed in a range of 500 Pa to 5 KPa depending on specified use and operating conditions of the intended exchanger.

Reference is now made to FIG. 3 showing a side view of an exemplary process 300 for manufacturing from metal (or metal framed) plate elements 310 an exemplary heat/enthalpy exchanger 330 e.g. for ventilation systems to exchange heat from outgoing to incoming air as well as humidity from outgoing to incoming air in winter (or vice versa for moisture reduction in summer or all year round in hot and humid climatic zones) in accordance with the teachings of the present invention. In the depicted example, the plate elements 310 are folded and crimped using a forming device 320 which may be, for example, a forming press or a die press. In a preferred embodiment, when applicable, the folding includes removing the protective temporary protective liner from the plate element 310. The folded and crimped plate elements form the heat/enthalpy exchanger 330. The heat/enthalpy exchanger 330 may then be subject to a gas tightness test 340, in accordance with current state of art practices.

Reference is now made to FIG. 4 showing a side view of an exemplary process 400 for manufacturing from plastic (or plastic famed) plate elements 410 exemplary heat/enthalpy exchanger 430 e.g. for ventilation systems to exchange heat from outgoing to incoming air as well as humidity from outgoing to incoming air in winter (or vice versa for moisture reduction in summer or all year round in hot and humid climatic zones) in accordance with the teachings of the present invention. In the depicted example, the individual plate elements 410 may be stacked and welded using a welding device 420 forming the heat/enthalpy exchanger 430. Welding may be achieved using, for example, laser or ultrasonic welding processes. The heat/enthalpy exchanger 430 may then be subject to a gas tightness test 440, as per current state of the art practices.

The drawing and the description do in no way restrict the invention and are meant for describing an example, only.

The description of the present invention has been presented for purposes of illustration but is not intended to be exhaustive or limited to the disclosed embodiments. Many modifications and variations will be apparent to those of ordinary skill in the art. The embodiments were chosen to explain the principles of the invention and its practical applications and to enable others of ordinary skill in the art to understand the invention in order to implement various embodiments with various modifications as might be suited to other contemplated uses.

What is claimed is:

1. A method for the production of enthalpy exchanger elements comprising the steps of:
    perforating a flat plate element according to a predetermined perforation pattern within the plate outer dimensions;
    applying to at least one side of the plate element a polymer film with water vapor transmission characteristics; and
    forming the plate element into a desired shape exhibiting a corrugation pattern, whereby the polymer film is formed into the same corrugation pattern shape as that of the plate element;
    wherein a perforation density, defined by a number of perforations per unit area, in a border area of the plate element is larger than in a middle area of the plate element to allow for extended efficiency tunability of the enthalpy exchange plate element.

2. The method according to claim 1, characterized in that the flat plate element is formed of a plastic.

3. The method according to claim 1, characterized in that the flat plate element is perforated using at least one of a needle roller, pins, die punch, and a laser.

4. The method according to claim 1, characterized in that steps b) and c) are performed simultaneously.

5. The method according to claim 4, characterized in that after the polymer film is applied to the at least one side of the plate element, the polymer film is bonded to the plate element during the forming step of the plate element.

6. The method according to claim 1, characterized in that the polymer film is made of a sulfonated copolymer.

7. The method according to claim 1, characterized in that the spatial frequency of any corrugations running in parallel within the corrugation pattern and/or the perforation density, defined by a number of perforations per unit area, is varied to improve frost resistance.

8. An enthalpy exchanger element produced using the method as defined in claim 1, including a plate element with a shape exhibiting a predetermined perforation pattern and a predetermined corrugation pattern, wherein at least one side of the plate element is covered by a polymer film with water vapor transmission characteristics.

9. The enthalpy exchanger element according to claim 8, characterized in that the polymer film is bonded to the plate element.

10. The enthalpy exchanger element according to claim 8, characterized in that the perforated area of the plate element includes corrugated surface areas.

11. The enthalpy exchanger element according to claim 8, characterized in that the width of corrugations in the border areas of the plate element is larger than the width of corrugations in the middle area of the plate element and/or the perforation density, defined by a number of perforations per unit area, in a border area of the plate element is larger than in the middle area of the plate element.

12. The enthalpy exchanger element according to claim 8, characterized in that the corrugations are oriented to guide a fluid flow.

13. The enthalpy exchanger element according to claim 8, characterized in that the perforations are openings of diverse shapes and sizes with a surface area no less than 50% of the plate surface.

14. The enthalpy exchanger with at least three plates like enthalpy exchanger elements fixed to each other in parallel orientation to form two fluid paths allowing fluids to flow there through, characterized in that the plate like heat exchanger elements are elements according to claim 8.

15. The enthalpy exchanger according to claim 14, characterized in that the enthalpy exchanger elements are fixed to each other by means of welding such as laser welding or ultrasonic welding, or by means of chemical solutions such as solvent or glue.

16. The method of claim 1, wherein the polymer film, provided as a roll, is applied to the at least one side of the flat perforated plate element which is also initially provided as a roll.

17. The method of claim 1, wherein the polymer film includes a temporary removable liner that protects the polymer film during the step of applying the polymer film to the flat plate element.

18. The method of claim 1, wherein the perforated flat plate element is maintained in a flat position when the polymer film is applied to the at least one side of the flat plate element before or during the step of forming the flat plate element.

19. The method of claim 1, wherein the polymer film is backed with a removable liner provided as a roll and is dispensed onto the flat perforated plate element to form a layered structure that is then delivered to a forming device for forming the plate element into the desired shape.

20. A method for the production of enthalpy exchanger elements comprising the steps of:

perforating a flat plate element according to a predetermined perforation pattern within the plate outer dimensions, wherein the perforated flat plate has a first region having a first perforation density and a second region having a second perforation density that is different than the first perforation density, the predetermined perforation pattern being preselected prior to perforating the flat plate element;

applying to at least one side of the plate element a polymer film with water vapor transmission characteristics; and forming the plate element into a desired shape exhibiting a corrugation pattern, whereby the polymer film is formed into the same corrugation pattern shape as that of the plate element;

wherein the polymer film is heat bonded or glued to the plate element while the plate element is being formed into the desired shape.

21. The method of claim 20, wherein the polymer film comprises a sulfonated block copolymer.

22. The method of claim 1, wherein the flat plate element is initially supplied in roll form as a plastic foil and is unrolled when feeding the plastic foil into a perforation device which perforates the plastic foil.

23. The method of claim 1, wherein the step of forming the plate element is performed by a vacuum thermoforming device that is configured to form the flat plate element into the corrugation pattern and simultaneously the polymer film is formed and heat bonded to the at least one side of the plate element.

24. The method of claim 1, wherein the polymer film consists of a material with properties that allows for latent energy exchange.

25. The method of claim 1, further including the step of strengthening a bond between the formed plate element and the polymer film prior to applying heat to form and bond the polymer film to the formed plate element.

26. The method of claim 1, wherein the flat plate elements comprises a rollable plastic foil that upon undergoing the forming step becomes more rigid and forms the plate element that has the desired shape exhibiting the corrugation pattern.

27. A method for the production of enthalpy exchanger elements comprising the steps of:

perforating a flat plate element according to a predetermined perforation pattern;

forming the perforated plate element into a desired shape exhibiting a corrugation pattern;

covering the at least one side of the perforated plate element with a thermo formable web prior to performing the step of forming the perforated plate element such that holes that form the perforation pattern are temporarily sealed; and applying to the at least one side of the formed plate element a polymer film with water vapor transmission characteristics, whereby the polymer film is formed into the same corrugation pattern shape as that of the formed plate element.

28. The method of claim 27, wherein the thermo formable web comprises a material that does not bond to the plate element during the forming step.

29. The method of claim 28, wherein the step of perforating the flat plate element according to the predetermined perforation pattern comprises perforating the first plate element such that a peripheral border region of the first plate element is free of perforations to allow for a gas tight sealing one the peripheral border region of one enthalpy exchanger element to another peripheral border region of another enthalpy exchanger element.

30. The method of claim 29, wherein the peripheral border region has a width of between 5 mm and 20 mm.

31. The method of claim 27, wherein the polymer film that is applied is provided as a preformed roll of plastic foil that is rolled onto the least one side of the formed plate element.

32. The method of claim 20, wherein the step of perforating the plate element comprises introducing the plate element into a perforation device that acts on the plate element to form perforations according to the predetermined perforation pattern.

33. The method of claim 20, wherein the step of applying the polymer film and the step of forming the plate element are performed simultaneously in that after the polymer film is applied to the at least one side of the plate element, the polymer film is bonded to the plate element during the forming step of the plate element which comprises using a vacuum and pressure thermoforming device to corrugate the plate element along both the at least one side of the plate element and an opposite side of the plate element.

* * * * *